(12) United States Patent
DeCourville et al.

(10) Patent No.: US 7,079,824 B2
(45) Date of Patent: Jul. 18, 2006

(54) RECEPTION OF MULTICARRIER SPREAD-SPECTRUM SIGNALS

(75) Inventors: Marc DeCourville, Gif-sur-Yvette (FR); Patrick Maille, Cesson-Sevigne (FR); Merouane Debbah, Wien (FR)

(73) Assignee: Motorola, Inc., Schaumburg, IL (US)

( * ) Notice: Subject to any disclaimer, the term of this patent is extended or adjusted under 35 U.S.C. 154(b) by 177 days.

(21) Appl. No.: 10/502,072

(22) PCT Filed: Jan. 22, 2003

(86) PCT No.: PCT/EP03/00596

§ 371 (c)(1),
(2), (4) Date: Jul. 19, 2004

(87) PCT Pub. No.: WO03/065635

PCT Pub. Date: Aug. 7, 2003

(65) Prior Publication Data

US 2005/0107053 A1    May 19, 2005

(30) Foreign Application Priority Data

Jan. 31, 2002  (EP) ................. 02290219
Feb. 6, 2002  (EP) ................. 02290289

(51) Int. Cl.
*H04B 1/06* (2006.01)
*H04B 7/00* (2006.01)

(52) U.S. Cl. ............... 455/234.1; 370/203; 370/208; 370/210; 375/140; 375/141; 375/144; 375/148; 375/260; 375/346; 375/350

(58) Field of Classification Search ............ 455/234.1, 455/10; 370/203, 208, 210; 375/140, 141, 375/144, 148, 260, 346, 350
See application file for complete search history.

(56) References Cited

U.S. PATENT DOCUMENTS 6,711,120 B1 * 3/2004 Laroia et al. ............... 370/204
2003/0112745 A1 * 6/2003 Zhuang et al. ............. 370/208

OTHER PUBLICATIONS

Baudais J-Y et al: "An Improved Linear MMSE Detection Technique for Multi-Carrier CDMA Systems: Comparison and Combination with Interference Cancellation Schemes", European Transactions on Telecommunications, Eurel Publication, Milano, IT, vol. 11, NR. 6, Nov. 2000, pp. 547-554. XP001006826 ISSN: 1124-318X.

(Continued)

*Primary Examiner*—Duc Nguyen
*Assistant Examiner*—Tuan H. Nguyen
(74) *Attorney, Agent, or Firm*—Jeffrey K. Jacobs

(57) ABSTRACT

A system (100), receiver (160-190) and method of operation for spread OFDM wireless communication (single user OFDM-CDMA with cyclic-prefix) by: equalizing the received spread OFDM signal (y) and splitting it into first and second portions ($\hat{s}_1$, $\hat{s}_2$); making a decision on the second portion and subtracting the second portion from the received signal to produce a first difference signal; processing the first difference signal to recover the first portion of the received signal in which symbol interfering terms of the second portion are substantially reduced; making a decision on the first portion and subtracting the first portion from the received signal to produce a second difference signal; and processing the second difference signal to recover the second portion of the received signal in which symbol interfering terms of the first portion are substantially reduced. The process may be iterated extensively at this stage. In a second stage, the recovered received signal is split into a greater number of portions (e.g., 4), and processed similarly to further reduce interference. The same mechanisms can be applied to blocks of reduced size (divided into 8, 16 etc.) leading to a higher resolution of the decoding and a tree-like structure.

Also, minimum mean square error equalization is performed by multiplying by a first diagonal matrix having elements dependent on channel coefficients; and multiplying by a second matrix which is a subset of a Walsh Hadamard matrix.

This provides low arithmetical complexity, it is possible to adjust the number of iterations to be performed based on a performance/complexity tradeoff, it can be viewed as a simple extension of current OFDM systems, and it yields a significant PER performance enhancement (e.g., 3 dB).

12 Claims, 5 Drawing Sheets

OTHER PUBLICATIONS

Kalofonos, D N et al: Performance of the multi-stage detector for a MC-CDMA system in a Rayleigh fading channel, Global Telecommunications Conference, 1996. GLOBECOM '96. 'Communications: The Key To Global Prosperity London, UK Nov. 18-22, 1996, New York, NY, USA, IEEE, US, pp. 1784-1788. XP010220186.

Bury A et al: "Block transmission equalizers using constrained minimum variance filters with application to MC-CDMA", vol. 1, Sep. 6-8, 2000, pp. 159-163 XP010517542.

Hélard J—F et al.: "Linear MMSE detection technique for MC-CDMA", Electronics Letters, IEE Stevenage, GB, vol. 36, NR. 7, Mar. 20, 2000, pp. 665-666. XP006015082.

Ginis G et al: "On The Releation Between V-Blast and The GDFE", IEEE Communications Letters, IEEE Service Center, Piscataway, US, US, vol. 5, NR. Sep. 9, 2001 pp. 364-366. XP001107969.

* cited by examiner

RECEPTION OF MULTICARRIER SPREAD-SPECTRUM SIGNALS

FIELD OF THE INVENTION

This invention relates to multicarrier wireless communication systems, and more specifically Orthogonal Frequency Division Multiplex (OFDM) modulation schemes.

BACKGROUND OF THE INVENTION

Such modulation schemes are now widely used in standards as a means to provide high data rates for communication systems including wireless local area networks (WLANs): 'IEEE 802.11a' in USA and 'HIPERLAN/2' in Europe, ADSL (Asynchromous Digital Subscriber Line) over twisted pairs and 'HomePLUG' on powerlines.

For the next decade, the challenge is to deliver an increased data rate coping with the requirements of multimedia broadband transmissions. None of the existing standards will be able to meet these requirements on a larger scale (involving many users) which motivates the search for more robust yet simple modulation schemes that, combined with an appropriate decoding algorithm, show better performance in terms of Packet Error Rate (PER) than classical OFDM systems. This technical criterion translates directly into increased system throughput. Clearly, an attractive property for such a new modulation scheme would be for it to be viewed as a simple extension of OFDM so that it could be implemented in existing standards as a proprietary transmission mode. In this way it could also provide a means for smooth transition to new standards.

In the field of this invention, enhancements have been proposed as a workaround for alleviating an inherent OFDM weakness: when a carrier is subject to a strong channel attenuation, even in absence of noise, the data conveyed is irremediably lost. The classical alternative is to use forward error correction (FEC) coding to spread the information along the carriers, but another strategy has been proposed: to combine the strength of OFDM and CDMA by pre-processing the block of symbols to be transmitted by a unitary spreading matrix W (often chosen to be a Walsh Hadamard transform for its attractive implementation properties) prior to the FFT/IFFT (Fast Fourier Transform/Inverse FFT) modulation.

This redundantless precoder W has the role of uniformly spreading the information to be transmitted on all the carriers so that even if one carrier is unrecoverable, the information transmitted can still be retrieved by decoding of other subbands.

Implementations of such spread OFDM (SOFDM also known as single user OFDM-CDMA with cyclic prefix) modulation techniques require successive interference cancellation (SIC), and many SIC algorithms have been proposed. One of the most well known is 'V-BLAST' proposed by Bell Labs for multiple antennas systems in the publication by G. J. Foschini and M. J. Gans, "On Limits of Wireless Communications in a fading Environment when Using Multiple Antennas", *Wireless Personnal Communications* 6:311–335, 1998. However, it has been demonstrated (in the publication by P. Loubaton, M. Debbah and M. de Courville, "Spread OFDM Performance with MMSE Equalization", in *International Conference on Acoustics, Speech, and Signal Processing*, Salt Lake City, USA, May 2001) that V-BLAST algorithms are not suited for conventional SOFDM systems due to the averaging of the SNRs (signal/noise ratios) at the receiver across the carriers during the despreading step. Moreover, such approaches lead to a tremendous decoding complexity due to the computation of several pseudo inverse matrices.

A need therefore exists for an OFDM communication system and decoding algorithm for use therein wherein the abovementioned disadvantage(s) may be alleviated.

STATEMENT OF INVENTION

The present invention provides a method of decoding a received spread OFDM wireless communication signal, and a receiver comprising decoding means for decoding a received signal by such a method, in a spread OFDM wireless communication receiver, as described in the accompanying claims.

In one embodiment of the present invention, the decoding algorithm comprises splitting a received block into two equal parts, one of the parts being decoded first and then subtracted from the received vector to suppress part of the interference and the other of the parts being decoded pext. This iterative procedure can be further extended by successive block splitting and results in a multi-resolution decoding algorithm. An attractive property of this algorithm is that although it still relies on the computation of pseudo-inverses, the expressions of these pseudo-inverses are easy to derive and may consist simply in the product of a diagonal matrix by a Walsh Hadamard transform. Thus, using Walsh Hadamard spreading sequences, the inherent complexity penalty of a V-BLAST decoding schemes is simply removed. This allows a significant gain in performance (e.g., around 3-4dB compared to MMSE SOFDM) with only a modest increase, in complexity, which motivates:

i) the use of such new modulation schemes in practice and
  ii) their proposal as a solution for future wireless LAN standards.

The following technical merits of the multi-resolution decoding algorithm of this embodiment of the present invention can be highlighted:

Low arithmetical complexity compared to existing SIC BLAST techniques with same or better performance.
  Flexibility and scalability of the method (it is possible to adjust the number of iterations to be performed based on a performance/complexity tradeoff).
  Can be combined into all OFDM standards as a proprietary transmission mode (since it can be viewed as a simple extension of current OFDM systems)
  Yields a significant PER performance enhancement compared to classical OFDM and minimum mean square error (MMSE) SOFDM receivers (e.g., 3dB).

BRIEF DESCRIPTION OF THE DRAWINGS

One OFDM single user communication system and decoding algorithm for use therein incorporating the present invention will now be described, by way of example only, with reference to the accompanying drawing(s), in which.

DESCRIPTION OF PREFERRED EMBODIMENT(S)

As will be explained below, the decoding algorithm to be described significantly enhances performance compared to MMSE equalized SOFDM scheme, with a complexity excess that is marginal compared to V-BLAST decoding strategies.

Consider the dimension N×1 vector s representing the block of complex valued symbols to be transmitted (each one belonging to a finite alphabet called constellation, e.g., QPSK, QAM, etc.). The overall Spread-OFDM transmission system of interest 100 depicted in FIG. 1 includes, in a transmitter, a spreading matrix module 110, a module 120 providing modulation, a module 130 providing guard interval insertion and parallel-to-serial conversion, and a digital-to-analog converter 140. The transmitter is coupled via a wireless communication channel 150 to a receiver including a mixer and analog-to-digital converter 160, a module 170 providing guard interval suppression and serial-to-parallel conversion, a module 180 providing demodulation, and a module 190 providing demodulation.

Figure 1:
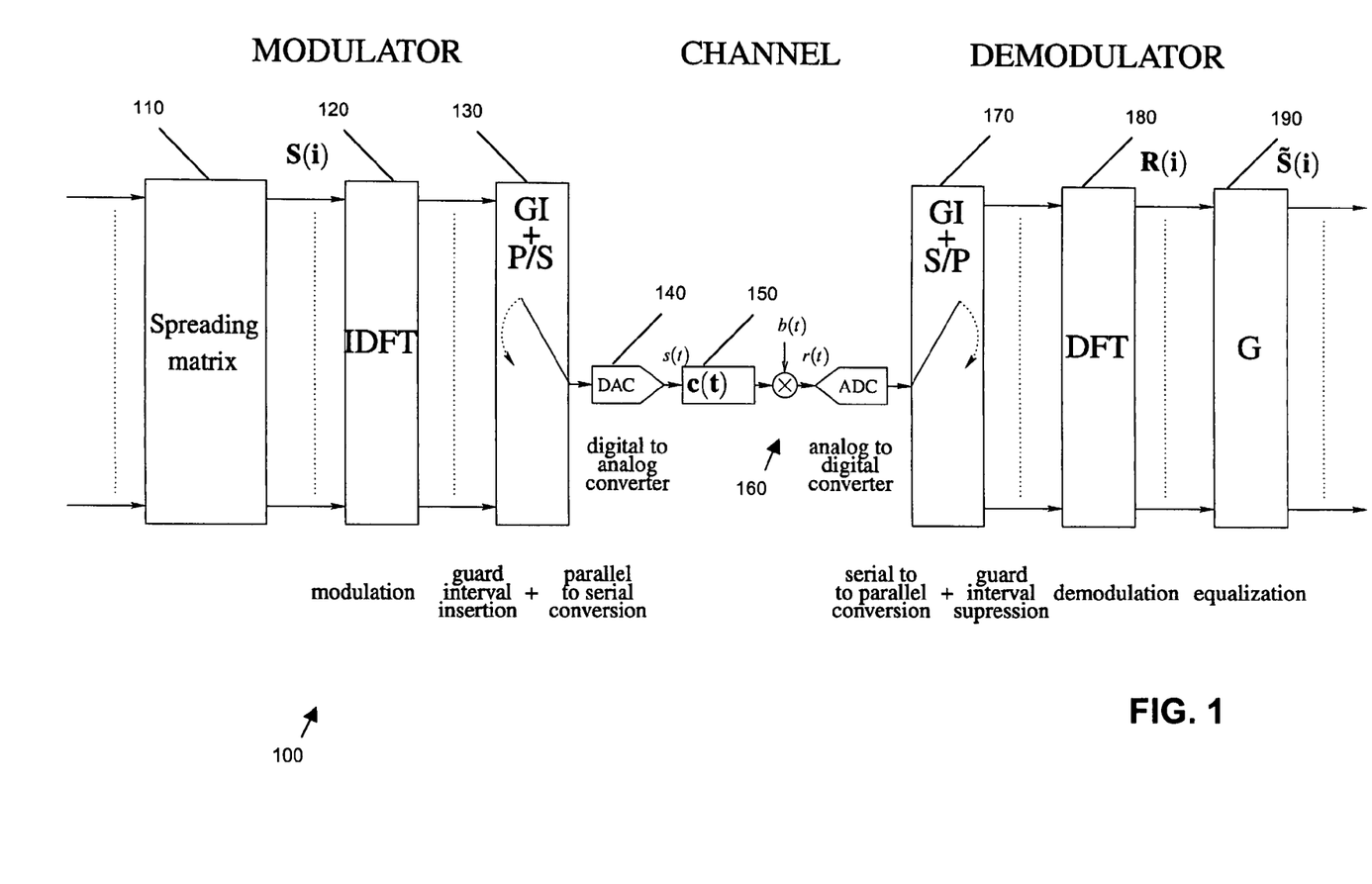
FIG. 1 shows a block schematic diagram of a OFDM-CDMA (spread OFDM) single user communication system.
Figure 2:
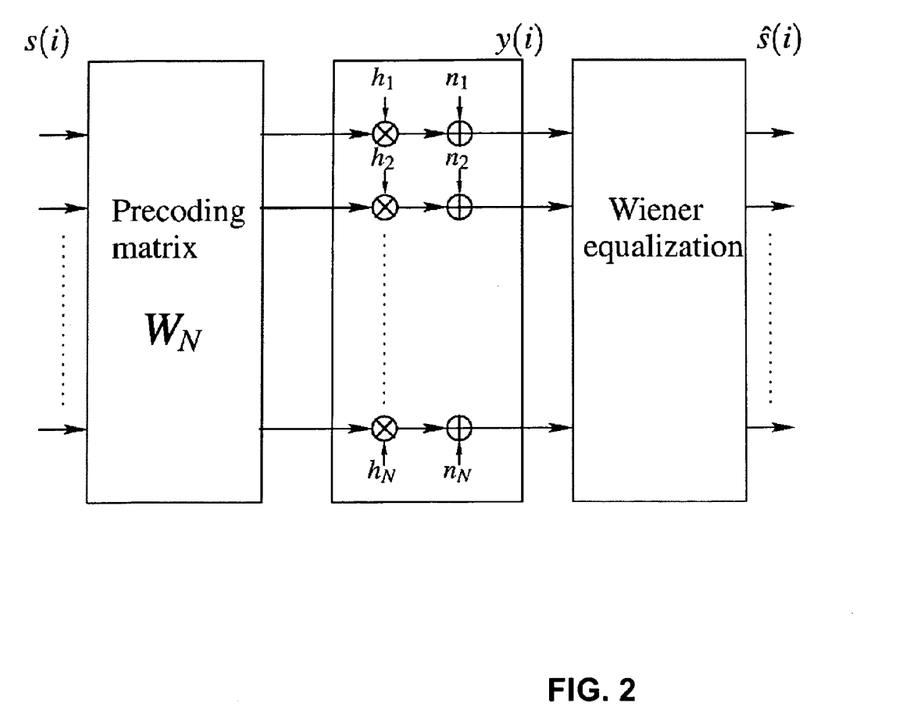
FIG. 2 shows a blcok schematic representation of the system of FIG. 1 modeled in the frequency domain.

The system of FIG. 1 can be modelled directly in the frequency domain as illustrated in FIG. 2 so that the received vector y expresses as:

$$y = HWs + b = Ms + b$$

where:
- H is a N×N diagonal matrix, bearing the complex frequency channel attenuations,
- W is a N×N unitary Walsh Hadamard spreading matrix, whose particular recursive structure is exploited in the decoding algorithm to reduce complexity, b is a N×1 complex white IID (independent and identically distributed) Gaussian noise vector whose component variance is $E\lfloor |b_k|^2 \rfloor = \sigma^2$ (E representing the mathematical expectation operator).

In the following anaysis, H, W and $\sigma^2$ are assumed to be known at the receiver by any given classical estimation technique.

The procedure described below deals with the retrieval of the information vector s based on the received vector y which is referred as the equalization step. Instead of using a traditional MMSE equalizer, a specific successive interference cancellation algorithm (termed a 'multi-resolution decoding algorithm') will be described. In the following analysis, $(\;)^h$ is defined as the Hermitian transpose operator and $I_N$ is defined as the N×N identity matrix.

The multi-resolution decoding algorithm is based on the following steps:
(i) Decode the received y vector by an MMSE equalizer followed by a non-linear decision function denoted by dec( ) (e.g., hard decision demapper, soft decision, etc.) $\hat{s} = dec(G_{MMSE}\, y)$ where $G_{MMSE} = M^h(M\, M^h + \sigma^2 I_N)^{-1}$ (convenient implementations of the product $G_{MMSE}\, y$ are detailed below).

(ii) Split the vector ŝ in two equal size N/2 parts $$\hat{s} = \begin{bmatrix} \hat{s}_1 \\ \hat{s}_2 \end{bmatrix}.$$

(iii) Subtract the second half $\hat{s}_2$ of the vector ŝ from the received vector y to remove the interference generated by the first half of s (treating $s_2$ as if $\hat{s}_2 = s_2$).

(iv) Perform an MMSE equalization of the resulting $y_1$ half-sized vector by matrix $G_1$, followed by the decision function dec( ) for obtaining a more reliable estimate $\hat{\hat{s}}_1$ of $s_1$ than $\hat{s}_1$.

(v) Possibly reiterate the procedure, this time on the first half of ŝ for retrieving a better estimate $\hat{\hat{s}}_2$ of $s_2$ than $\hat{s}_2$.

(vi) These operations can be repeated substituting $\hat{s}_1$ and $\hat{s}_2$ by $\hat{\hat{s}}_1$ and $\hat{\hat{s}}_1$ respectively Translated into equations, this amounts to the following steps:

First Stage (310) of the Multi-resolution Decoding Algorithm

Step 0, (300): MMSE equalization of y:

$$\hat{s} = \begin{bmatrix} \hat{s}_1 \\ \hat{s}_2 \end{bmatrix} = dec(G_{MMSE}\, y)$$

Step 1:

$$y_1 := y - M \begin{bmatrix} 0 \\ \hat{s}_2 \end{bmatrix} = M \begin{bmatrix} s_1 \\ s_2 - \hat{s}_2 \end{bmatrix} + b$$

Step 2: MMSE equalization of $\hat{\hat{s}}_1$: $\hat{\hat{s}}_1 = dec(G_1^{(1)} y_1)$ Step 3:

$$y_2 := y - M \begin{bmatrix} \hat{\hat{s}}_1 \\ 0 \end{bmatrix} = M \begin{bmatrix} s_1 - \hat{\hat{s}}_1 \\ s_2 \end{bmatrix} + b$$

Step 4: MMSE equalization of $\hat{\hat{s}}_2$: $\hat{\hat{s}}_2 = dec(G_2^{(1)} y_2)$ Step 5:

$$\hat{s} = \begin{bmatrix} \hat{s}_1 \\ \hat{s}_2 \end{bmatrix} := \begin{bmatrix} \hat{\hat{s}}_1 \\ \hat{\hat{s}}_2 \end{bmatrix}$$

Step 6: go to Step 1

It should be noted that although as stated above only a subdivision by two of the received vector y is performed, in its more generalized form the procedure can apply to smaller subdivisions of y of length N divided by a power of 2:$N/2^k$ for any integer k such that the result remains an integer. The generalized algorithm consists in reiterating the procedure already explained to each resulting sub-block of y. Let stage i of the algorithm define the operations performed for a level of subdivisions of y in blocks of size $N/2^i$.

As an illustration, the second stage of the proposed multi-resolution algorithm results in the following operations:

Second Stage (320) of the Multi-resolution Decoding Algorithm

Step 0: form $$\hat{s} = \begin{bmatrix} \hat{s}_1 \\ \hat{s}_2 \\ \hat{s}_3 \\ \hat{s}_4 \end{bmatrix}$$

Step 1:

$$y_1 := y - M \begin{bmatrix} 0 \\ \hat{s}_2 \\ \hat{s}_3 \\ \hat{s}_4 \end{bmatrix} = M \begin{bmatrix} s_1 \\ s_2 - \hat{s}_2 \\ s_3 - \hat{s}_3 \\ s_4 - \hat{s}_4 \end{bmatrix} + b$$

Step 2: MMSE equalization of $\hat{\hat{s}}_1$: $\hat{\hat{s}}_1 = \text{dec}(G_1^{(2)} y_1)$
Step 3:

$$y_2 := y - M \begin{bmatrix} \hat{s}_1 \\ 0 \\ \hat{s}_3 \\ \hat{s}_4 \end{bmatrix} = M \begin{bmatrix} s_1 - \hat{s}_1 \\ s_2 \\ s_3 - \hat{s}_3 \\ s_4 - \hat{s}_4 \end{bmatrix} + b$$

Step 4: MMSE equalization of $\hat{\hat{s}}_2$: $\hat{\hat{s}}_2 = \text{dec}(G_2^{(2)} y_2)$
Step 5:

$$y_3 := y - M \begin{bmatrix} \hat{s}_1 \\ \hat{s}_2 \\ 0 \\ \hat{s}_4 \end{bmatrix} = M \begin{bmatrix} s_1 - \hat{s}_1 \\ s_2 - \hat{s}_2 \\ s_3 \\ s_4 - \hat{s}_4 \end{bmatrix} + b$$

Step 6: MMSE equalization of $\hat{\hat{s}}_3$: $\hat{\hat{s}}_3 = \text{dec}(G_3^{(2)} y_3)$
Step 7:

$$y_4 := y - M \begin{bmatrix} \hat{s}_1 \\ \hat{s}_2 \\ \hat{s}_3 \\ 0 \end{bmatrix} = M \begin{bmatrix} s_1 - \hat{s}_1 \\ s_2 - \hat{s}_2 \\ s_3 - \hat{s}_3 \\ s_4 \end{bmatrix} + b$$

Step 8: MMSE equalization of $\hat{\hat{s}}_4$: $\hat{\hat{s}}_4 = \text{dec}(G_4^{(2)} y_4)$
Step 9: $\hat{s} := \hat{\hat{s}}$
Step 10: go to Step 1

Note that $G_i^{(\gamma)}$ denotes the MMSE equalizer matrix at stage $\gamma$ for the sub-block r of vector y of size $N/2^\gamma$.

Figure 3:
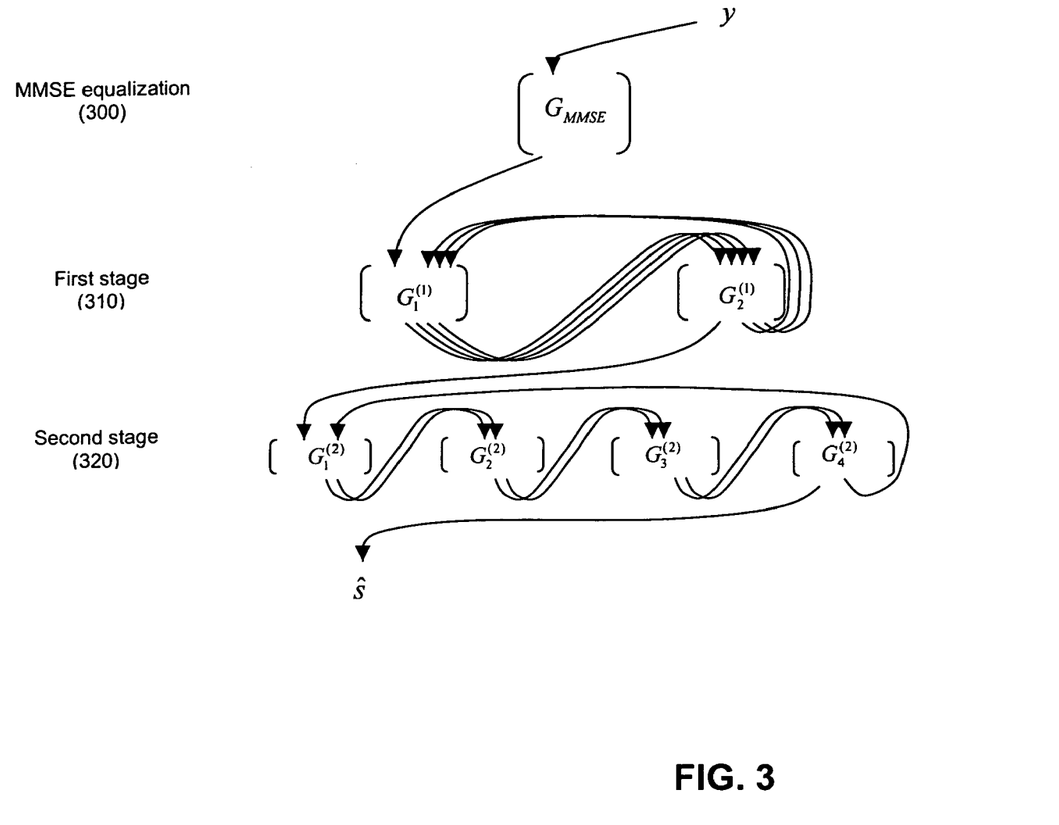
FIG. 3 shows a diagrammatic binary tree representation of the two-stage multi-resolution decoding algorithm used in the system of FIG. 1.

It is important to note that each stage can be sequenced in many ways following the graphic illustration of FIG. 3 using a binary tree. Each path in the binary tree results into another instantiation of the proposed algorithm. The depth in terms of number of stages and the number of times each of the stages has to be iterated can be determined by a complexity/performance trade-off criterion.

Thus in order to refine the decoding, the same mechanisms can be applied to blocks of size N/4, and then N/8, etc. leading to a higher resolution of the decoding.

Clearly, increasing the number of stages and iterations yields a more robust estimation procedure. However, simulations show that the bit error rate converges after a few iterations, so to improve again the decoded vector, fortunately in practice only the second stage of the algorithm needs to be considered.

A fast algorithm for computing the product of vector $y_I$ by matrix $G_i^{(\gamma)}$ be implemented as follows.

Firstly, the expression of matrices $G_i^{(\gamma)}$ is examined, by fairly assuming that at each stage:

$$E([s_k - \hat{s}_k][s_k^H - \hat{s}_k^H]) \approx \rho(p_k) I_{N/2^\gamma}$$

$$E(s_k s_{k'}) \approx 0 \text{ for } k \neq k'$$

$$E(\hat{s}_k b^H) \approx 0$$

where E is the expectation operator and $\rho$ is a function of $p_k$, the bit error probability for the $k_{th}$ block after its last equalization, depending on the constellation used.

Under these assumptions, it is possible to calculate the expression of the MMSE equalization matrix used at each stage:

$$G_k^{(\gamma)} = \begin{bmatrix} 0_{\frac{N}{2^\gamma} \times \frac{(k-1)N}{2^\gamma}} & I_{\frac{N}{2^\gamma}} & 0_{\frac{N}{2^\gamma} \times \frac{(2^\gamma - k)N}{2^\gamma}} \end{bmatrix} M^H \left( M D_k^{(\gamma)} M + \sigma^2 I_N \right)^{-1}$$

where $D_k^{(\gamma)}$ is the following block-diagonal matrix:

$$D_k^{(\gamma)} = \text{diag}\left( \rho(p_1) I_{\frac{N}{2^\gamma}} \cdots \rho(p_{k-1}) I_{\frac{N}{2^\gamma}} \quad I_{\frac{N}{2^\gamma}} \quad \rho(p_{k+1}) I_{\frac{N}{2^\gamma}} \cdots \rho(p_{2^\gamma}) I_{\frac{N}{2^\gamma}} \right)$$

Simulations show that the terms $\rho(p_k)$ do not play an important role in overall performance, and thus can be neglected (replaced by 0), which greatly simplifies the calculus of the matrix products. It can be shown that in this case, when defining the $$\frac{N}{2^\gamma} \times \frac{N}{2^\gamma}$$

diagonal matrix:

$$\Delta_\gamma = \text{diag}\left\{ \frac{1}{\sigma^2 + \frac{1}{2^\gamma} \sum_{k=0}^{2^\gamma - 1} |h_{i + kN/2^\gamma}|^2} \right\}_{i=1}^{N/2^\gamma}$$

the following general result is obtained:

$$\begin{bmatrix} G_1^{(\gamma)} \\ \cdots \\ G_{2^\gamma}^{(\gamma)} \end{bmatrix} = W \begin{bmatrix} \Delta_\gamma & 0 & 0 \\ 0 & \cdots & 0 \\ 0 & 0 & \Delta_\gamma \end{bmatrix} H^*$$

Thus the product by $G_i^{(\gamma)}$ reduces simply to the product of $y_I$ by a diagonal matrix depending on the channel coefficients (computed and stored once only) followed by the products of a subset of a Walsh-Hadamard matrix of size $$\frac{N}{2^\gamma} \times N.$$

Therefore, the procedure detailed in the two previous equations results in a simple low arithmetical complexity way for performing the various MMSE equalizations steps. Instead of the expected heavy arithmetic complexity order of $N^3$ required by the $G_i^{(\gamma)}$ product, a much simpler complexity of order $$2^\gamma N \log_2\left(\frac{N}{2^\gamma}\right)$$

at each stage results.

The complexity of the multi-resolution decoding algorithm described above can be estimated as follows.

The arithmetical simplifications due to the Walsh-Hadamard structure lead to quite a low complexity. At each stage $\gamma$ of the algorithm, the complexity $C(\gamma,N)$ of one iteration (i.e., $2^\gamma$ calculus of y, of $G_i^{(\gamma)}y$ and decisions) can be overestimated:

$$C(\gamma, N) \approx N\left(2^\gamma\left(2\log_2\left(\frac{N}{2^\gamma}\right)+6\right)+2+\frac{3}{2^\gamma}\right) \times AddR +$$
$$N\left(3 \times 2^\gamma + 4 + \frac{5}{2^\gamma}\right) \times MulR + N \times Decision$$

where AddR is the complexity of an addition of two real values (assumed equal to that of a subtraction), MulR is the complexity of a multiplication, and Decision is the complexity of a hard decision on a complex value (the choice of a symbol).

Figure 4:
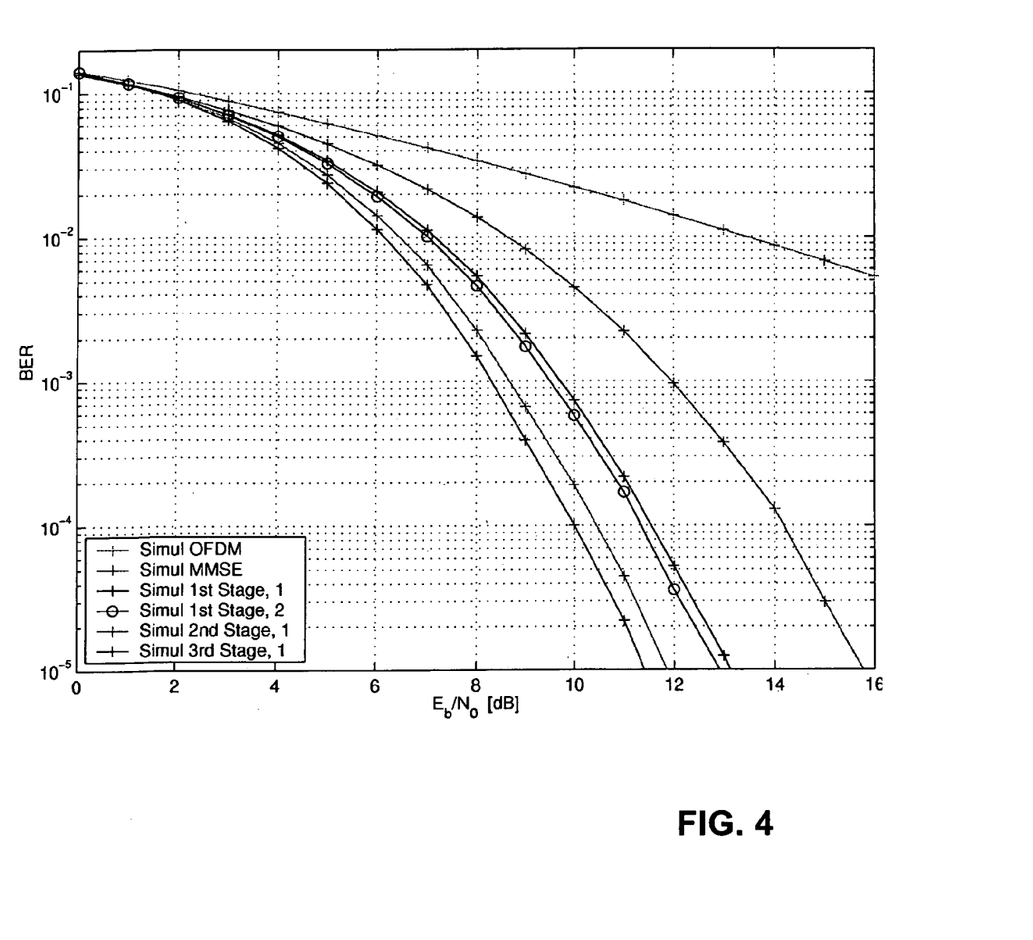
FIG. 4 and FIG. 5 show graphical representations of simulation performance of the multi-resolution decoding algorithm compared with other decoding scenarios under different respective channel profiles in terms of BER (bit error rate) as a function of $$\frac{E_b}{N_0}$$ (energy per bit/noise energy).
Figure 5:
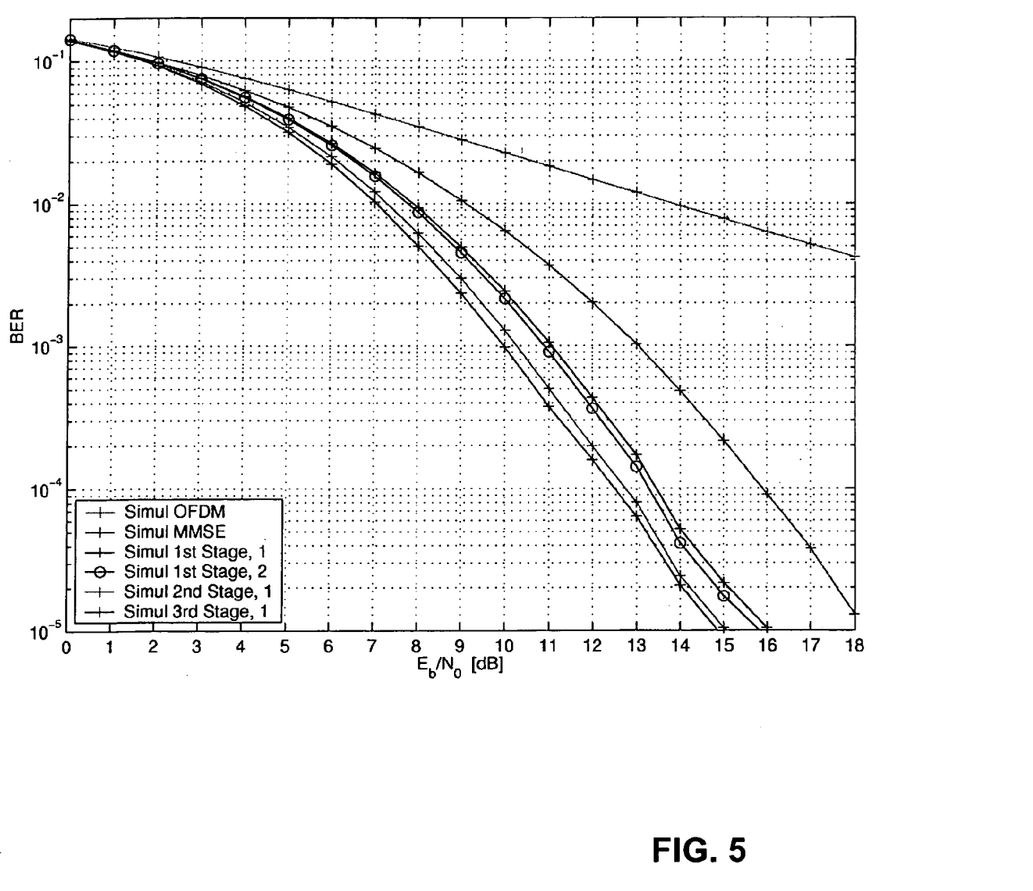

There follows an illustration of the performance improvement provided by the above-described multi-resolution decoding algorithm in the context of a 5.2 GHz, 20 MHz bandwidth, 64 carrier with 800 ns guard time HIPERLAN/2 OFDM system using a QPSK constellation. Simulations were run using 2 channel profiles: (i) a perfect time interleaved BRAN 'E' channel model, and (ii) pure independent Rayleigh fadings in the frequency domain. The results in terms of bit error rate (BER) for uncoded scenarios as a function of the ratio $$\frac{E_b}{N_0} \text{ (energy per bit/noise energy)}$$

are provided FIG. 4 and FIG. 5.

A clear improvement can be observed by applying the new decoding strategy compared with OFDM and MMSE SOFDM systems using a Walsh-Hadamard spreading sequence: for a target BER of $10^{-4}$, more than 3 dB is gained compared to MMSE SOFDM applying one or two iterations at the three first stages.

This means that for the same fixed BER and a given C/I (carrier to interference), 16QAM SOFDM with multiresolution decoding would have the same performance of a QPSK SOFDM MMSE transmission scheme while providing an enhancement of 4 times in bit rate. Such a significant improvement illustrates how improved decoding schemes for existing systems can translate directly in greater system capacity under a given QoS constraint.

It will be understood that the multi-resolution decoding algorithm for OFDM-CDMA, spread OFDM single user systems described above provides the following advantages: The following technical merits of the new multi-resolution decoding algorithm can be highlighted:

Low arithmetical complexity compared to existing SIC BLAST techniques with same or better performance.

Flexibility and scalability of the method (it is possible to adjust the number of iterations to be performed based on a performance/complexity tradeoff).

Can be combined into all OFDM standards as a proprietary transmission mode (since it can be viewed as a simple extension of current OFDM systems).

Yields a significant PER performance enhancement compared to classical OFDM and minimum mean square error (MMSE) SOFDM receivers (e.g., 3 dB).

The invention claimed is:

1. A method of decoding a received spread OFDM wireless communication signal comprising:

performing an equalizing and decision function on the received spread OFDM signal (y), splitting the equalized and decided spread OFDM signal block ($\hat{s}$) into a number $2^i$ of portions ($\hat{s}_1, \hat{s}_2, \hat{s}_3, \hat{s}_4$), such that $$\hat{s} = \begin{bmatrix} \hat{s}_1 \\ \hat{s}_2 \\ \hat{s}_3 \\ \hat{s}_4 \\ \vdots \end{bmatrix},$$

where i is positive integer;
characterised by:
for each of said portions ($\hat{s}_1$) of the equalized and decided signal block in turn subtracting values M $$(M \begin{bmatrix} 0 \\ \hat{s}_2 \\ \hat{s}_3 \\ \hat{s}_4 \\ \vdots \end{bmatrix})$$

derived from the other portions ($\hat{s}_2$ to $\hat{s}_4 \ldots$) of the equalized and decided signal block from the received signal block (y) to produce a respective difference signal, where M=H·W, H is an N×N diagonal matrix related to the complex frequency channel attenuations and W is an N×N unitary spreading matrix; and performing an equalising and decision function on the respective difference signal to produce a further processed equalized and decided portion ($\hat{\hat{s}}_1$) of the received signal in which interference due to the other portions ($\hat{s}_2$ to $\hat{s}_4$) of the equalized and decided signal block is substantially reduced;

the steps of producing the respective difference signal and performing the equalising and decision function to produce the further processed equalized and decided portion being repeated for each of the other portions ($\hat{s}_2$, $\hat{s}_3$, $\hat{s}_4$) of the signal block.

2. A method as claimed in claim 1 wherein repeating subtracting the values derived from other portions of the equalized and decided signal block from the received signal to produce a respective further difference signal comprises subtracting values derived from at least one of said further processed portions ($\hat{\hat{s}}_2$ to $\hat{\hat{s}}_4$) of the received signal from the received spread OFDM signal (y).

3. A method as claimed in claim 1 further comprising iterating processing the signal block, including iterating the steps of producing the respective difference signal and performing the equalising and decision function to produce the further processed equalized and decided portion with values derived from the further processed portions ($\hat{\hat{s}}_1$ to $\hat{\hat{s}}_4$) in place of previously processed portions ($\hat{s}_1$ to $\hat{s}_4$), to recover still more reliable estimates for each of the portions.

4. A method as claimed in claim 3 wherein iterating processing the signal block includes splitting the equalized and decided spread OFDM signal block ($\hat{s}$) into a number $2^j$ of portions ($\hat{s}_1$ to $\hat{s}_4$), where j is a positive integer greater than i so that iterating the steps of producing the respective difference signal and performing the equalising and decision function to produce the further processed portion is performed with a greater number of portions than the previous steps.

5. A method as claimed in claim 1 wherein said equalizing steps comprise multiplying by a first diagonal matrix having elements dependent on channel coefficients; and multiplying by a second matrix which is a subset of a Walsh Hadamard matrix.

6. A method as claimed in claim 1 wherein said equalizing steps comprise performing minimum mean square error equalization.

7. A receiver (160–180) for use in a spread OFDM wireless communication system (100), the receiver comprising means for receiving a spread OFDM wireless communication signal, and decoding means for decoding the received signal by a method as claimed in any preceding claim, said decoding means comprising:

equalizing and decision means for performing said equalizing and decision function on the received spread OFDM signal (y), means for splitting the equalized and decided spread OFDM signal block ($\hat{s}$) into a number $2^i$ of portions ($\hat{s}_1$, $\hat{s}_2$, $\hat{s}_3$, $\hat{s}_4$), such that $$\hat{s} = \begin{bmatrix} \hat{s}_1 \\ \hat{s}_2 \\ \hat{s}_3 \\ \hat{s}_4 \\ \vdots \end{bmatrix},$$

where i is positive integer;

characterised by:

subtracting means for subtracting, for each of said portions ($\hat{s}_1$) of the equalized and decided signal block in turn, said values M $$\left( M \begin{bmatrix} 0 \\ \hat{s}_2 \\ \hat{s}_3 \\ \hat{s}_4 \\ \vdots \end{bmatrix} \right)$$

derived from the decided other portions ($\hat{s}_2$ to $\hat{s}_4$ ...) of the equalized and decided signal block from the received signal block (y) to produce a respective difference signal, where M=H·W, H is an N×N diagonal matrix related to the complex frequency channel attenuations and W is an N×N unitary spreading matrix;

said equalizing and decision means being arranged to perform said equalising and decision function on the respective difference signal to produce said further processed equalized and decided portion ($\hat{\hat{s}}_1$) of the received signal in which interference due to the other portions ($\hat{s}_2$ to $\hat{s}_4$) of the equalized and decided signal block is substantially reduced;

and said decoding means being arranged to repeat, for each of the other portions ($\hat{s}_2$, $\hat{s}_3$, $\hat{s}_4$) of the signal block, said steps of producing the respective difference signal and performing the equalising and decision function to produce the further processed equalized and decided portion.

8. A receiver as claimed in claim 7 wherein said subtracting means is arranged so that repeating subtracting the values derived from the other portions of the equalised and decided signal block from the received signal to produce a respective further difference signal comprises subtracting values derived from at least one of said further processed portions ($\hat{\hat{s}}_2$ to $\hat{\hat{s}}_4$) of the received signal from the received spread OFDM signal (y).

9. A receiver as claimed in claim 7 wherein said decoding means is arranged to iterate processing the signal block, including iterating the steps of producing the respective difference signal and performing the equalising and decision function to produce the further processed equalized and decided portion with values derived from the further processed portions ($\hat{\hat{s}}_1$ to $\hat{\hat{s}}_4$) in place of previously processed portions ($\hat{\hat{s}}_1$ to $\hat{\hat{s}}_4$), to recover still more reliable estimates for each of the portions.

10. A receiver as claimed in claim 9 wherein said decoding means is arranged so that iterating processing the signal block includes splitting the equalized and decided spread OFDM signal block ($\hat{s}$) into a number $2^j$ of portions ($\hat{s}_1$ to $\hat{s}_4$), where j is positive integer greater than i so that iterating the steps of producing the respective difference signal and performing the equalising and decision function to produce the further processed portion is performed with a greater number of portions than the previous steps.

11. A receiver as claimed in claim 7 wherein said equalizing and decision means comprises matrix multiplication means for multiplying by a first diagonal matrix having elements dependent on channel coefficients and by a second matrix which is a subset of a Walsh Hadamard matrix.

12. A receiver as claimed in claim 7 wherein said equalizing and decision means comprises means for performing minimum mean square error equalization.

* * * * *